US011197420B2

(12) United States Patent
Kumar et al.

(10) Patent No.: US 11,197,420 B2
(45) Date of Patent: Dec. 14, 2021

(54) VARIABLE MULCHING ASSEMBLY FOR USE WITH A LAWNMOWER

(71) Applicant: Honda Motor Co., Ltd., Tokyo (JP)

(72) Inventors: Surender Kumar, Mebane, NC (US); Scott J. Kaskawitz, Hillsborough, NC (US); Christopher Kurt Zingelmann, Jr., Raleigh, NC (US)

(73) Assignee: Honda Motor Co., Ltd., Tokyo (JP)

( * ) Notice: Subject to any disclaimer, the term of this patent is extended or adjusted under 35 U.S.C. 154(b) by 294 days.

(21) Appl. No.: 16/366,876

(22) Filed: Mar. 27, 2019

(65) Prior Publication Data

US 2020/0037504 A1 Feb. 6, 2020

Related U.S. Application Data

(63) Continuation-in-part of application No. 16/052,390, filed on Aug. 1, 2018.

(51) Int. Cl.
*A01D 42/00* (2006.01)
*A01D 34/81* (2006.01)
(Continued)

(52) U.S. Cl.
CPC ......... *A01D 42/005* (2013.01); *A01D 34/005* (2013.01); *A01D 34/81* (2013.01); *A01D 2101/00* (2013.01)

(58) Field of Classification Search
CPC .... A01D 42/005; A01D 34/005; A01D 34/71; A01D 34/81; A01D 34/66; A01D 34/667; A01D 34/668; A01D 34/685
See application file for complete search history.

(56) References Cited

U.S. PATENT DOCUMENTS 2,685,774 A 8/1954 Williams
3,531,923 A * 10/1970 De Lay ............... A01D 34/005
56/12.8
(Continued)

FOREIGN PATENT DOCUMENTS

EP 1364568 A1 11/2003
EP 2371203 A1 10/2011
WO 1998034462 A1 8/1998

OTHER PUBLICATIONS

European Patent Application Publication with European Search Report for application No. 19188486.5, Published on Feb. 5, 2020.

*Primary Examiner* — Thomas B Will
*Assistant Examiner* — Joan D Misa
(74) *Attorney, Agent, or Firm* — American Honda Motor Co., Inc.; Gregory J. Burke

(57) ABSTRACT

A convertible lawnmower with a mulching mode and a discharge mode includes a housing and a mulching system. The housing includes a discharge opening. The mulching system includes a mounting ring and a shutter ring. The mounting ring is coupled substantially concentrically to the housing and includes an upper surface, a lower surface, and a sidewall that extends substantially axially therebetween. The sidewall is formed with a retaining groove and at least one installation groove. The retaining groove extends at least partially circumferentially within an inner surface of the sidewall and each installation groove extends axially from the lower surface to the retaining groove. The shutter ring is only coupled to mounting ring via the retaining groove such that the shutter ring is selectively shiftable between a mulching mode and a discharge mode.

20 Claims, 11 Drawing Sheets

(51) Int. Cl.
*A01D 34/00* (2006.01)
*A01D 101/00* (2006.01)

(56) References Cited

U.S. PATENT DOCUMENTS

| | | | |
|---|---|---|---|
| 4,205,510 A * | 6/1980 | Raniero | A01D 34/82 56/12.9 |
| 5,191,756 A * | 3/1993 | Kuhn | A01D 34/005 56/13.4 |
| 5,499,495 A * | 3/1996 | Heisman | A01D 34/82 56/17.5 |
| 6,735,932 B2 * | 5/2004 | Osborne | A01D 42/005 56/17.5 |
| 6,751,937 B2 * | 6/2004 | Kobayashi | A01D 34/71 56/202 |
| 6,843,048 B2 * | 1/2005 | Osborne | A01D 42/005 56/320.2 |
| 6,874,310 B2 | 4/2005 | Osborne | |
| 7,055,301 B2 * | 6/2006 | Osborne | A01D 42/005 56/320.1 |
| 7,146,791 B2 | 12/2006 | Benway et al. | |
| 7,571,593 B2 * | 8/2009 | Kucera | A01D 43/063 56/202 |
| 8,015,786 B2 * | 9/2011 | Minami | A01D 42/005 56/320.2 |
| 8,234,849 B2 | 8/2012 | Shimozono et al. | |
| 10,945,366 B2 * | 3/2021 | Desai | A01D 34/6806 |
| 2003/0217542 A1 | 11/2003 | Osborne | |
| 2020/0214201 A1 * | 7/2020 | Bejcek | A01D 34/71 |

* cited by examiner

VARIABLE MULCHING ASSEMBLY FOR USE WITH A LAWNMOWER

CROSS REFERENCE TO RELATED APPLICATIONS

This application is a continuation-in-part and claims priority to and the benefit of the filing date of U.S. patent application Ser. No. 16/052,390, filed Aug. 1, 2018, for Variable Mulching Assembly For Use With a Lawnmower which is hereby incorporated by reference and is assigned to the assignee of the present application.

BACKGROUND

This invention relates generally to lawnmowers, and more particularly, to a variable mulching assembly for use with a lawnmower.

Known lawnmowers can be configured as garden tractors, riding mowers, commercial walk-behind mowers and smaller walk-behind mowers. Known smaller walk-behind mowers include a prime mover mounted to a housing deck. At least some known mower decks associated with garden tractors, riding mowers, and/or commercial walk-behind mowers are removably coupled to a frame of these self-propelled machines in a manner that allows the deck to "float along" the contour of the terrain at an adjustable height above the terrain. Such floating decks rely on a power take-off connected to the prime mover used to propel these self-propelled machines and, therefore, do not include a prime mover. At least one blade is typically mounted in a cutting chamber defined of the deck for any of these embodiments of a lawnmower.

At least some known lawnmowers can also be configured to either mulch the clippings or to discharge the clippings through a discharge chute formed in the housing. During mulching, mowers cut the lawn clippings into fine particles that are blown downward below the surface of the lawn. Discharge mowers either discharge the clippings directly onto the lawn surface or into a bag coupled to the mower for disposal elsewhere. Some lawnmowers, known as convertible lawnmowers, can be converted between mulching lawnmowers and discharge lawnmowers by inserting or removing separate elements within the cutter housing and/or the discharge chute.

At least one other known convertible lawnmower includes a variable mulching system that enables a user to selectively move a plate from a first position during mulching, where the discharge opening is substantially blocked, to a second position where the discharge opening is partially or fully open to enable the clippings to be discharged into a bag or across the lawn surface. Although such convertible mowers are commercially successful, the variable mulching system is fairly complex and uses a ring that is maintained in position relative to the mower housing by a plurality of brackets that are mechanically coupled to the housing via a plurality of fasteners. The installation of such fasteners may be a laborious and time-consuming process when the mower is initially assembled. Moreover, after continued mower usage, disassembling the variable mulching system if components need repair or replacement may be even more time-consuming and difficult.

BRIEF DESCRIPTION

In one aspect, a lawnmower is provided. The lawnmower includes a housing and a mulching system. The housing includes a discharge opening. The mulching system includes a mounting ring and a shutter ring. The mounting ring is coupled substantially concentrically to the housing and includes an upper surface, a lower surface, and a sidewall that extends substantially axially therebetween. A platform track extends interior of the sidewall. The sidewall included at least one installation tab. The platform track extends interior at least partially circumferentially along an inner surface of the sidewall and each installation tab extends axially from the lower surface. The shutter ring is coupled to mounting ring via the platform track such that the shutter ring is selectively shiftable between a mulching mode and a discharge mode.

In another aspect, a lawnmower convertible between a mulching mode and a bagging mode is provided. The convertible lawnmower includes a housing, a mounting ring, and a shutter ring. The housing includes a discharge opening and the mounting ring is coupled substantially concentrically to the housing. The mounting ring includes an annular ring portion and a discharge plate portion that extends radially outwardly from the plate portion. The shutter ring is coupled to the mounting ring such that the shutter ring is substantially concentrically aligned with respect to the mounting ring. The shutter ring includes an annular band portion and a shutter plate portion that extends radially outwardly from the plate portion. One of the annular ring portion or the annular band portion includes at least one platform track defined therein. The other of the annular ring portion or the annular band portion includes at least one hook extending vertically therefrom that is sized for insertion within the at least one platform track to rotatably couple the mounting ring to the shutter ring. The shutter ring is coupled to the mounting ring via the at least one hook.

In yet another aspect, a mulching assembly for use with a lawnmower including a cutter housing with a mulching assembly. The mulching assembly includes a mounting ring with an annular ring portion and a discharge plate portion extending outwardly to couple to the cutter housing. A shutter ring is coupled to the mounting ring without the use of mechanical fasteners. The shutter ring includes an annular band portion and a shutter plate portion extending outwardly. The annular ring portion includes at least two arcuate platform tracks defined therein, and the annular band portion includes at least two hooks extending vertically. The hooks are sized so that said platform track is between an upper surface and a lower surface of the hooks u-shaped opening.

BRIEF DESCRIPTION OF THE DRAWINGS

FIG. 4 is a perspective view of the mounting ring shown in

FIG. 3.

DETAILED DESCRIPTION

Embodiments of the present disclosure relate to lawnmowers that include a variable mulching system that is convertible between a mulching mode and a bagging mode. In some embodiments, the variable mulching system is implemented within garden tractors, riding mowers, commercial walk-behind mowers and/or smaller walk-behind mowers. In each implementation, the variable mulching system includes a shutter ring coupled to a mounting ring without the use extraneous mechanical hardware, such as rivets, threaded fasteners, and/or the like. As used in herein, the term convertible refers to lawnmowers that include assemblies that are variably selected to enable the lawnmower to easily change from a mulching mode wherein fine grass clippings are discharged below the surface of the grass being cut, to a discharge mode wherein grass clippings are either discharged from the mower either across the surface of the grass being cut or into a collection bag. The embodiments described herein are exemplary and are not limited to the descriptions provided.

Figure 1:
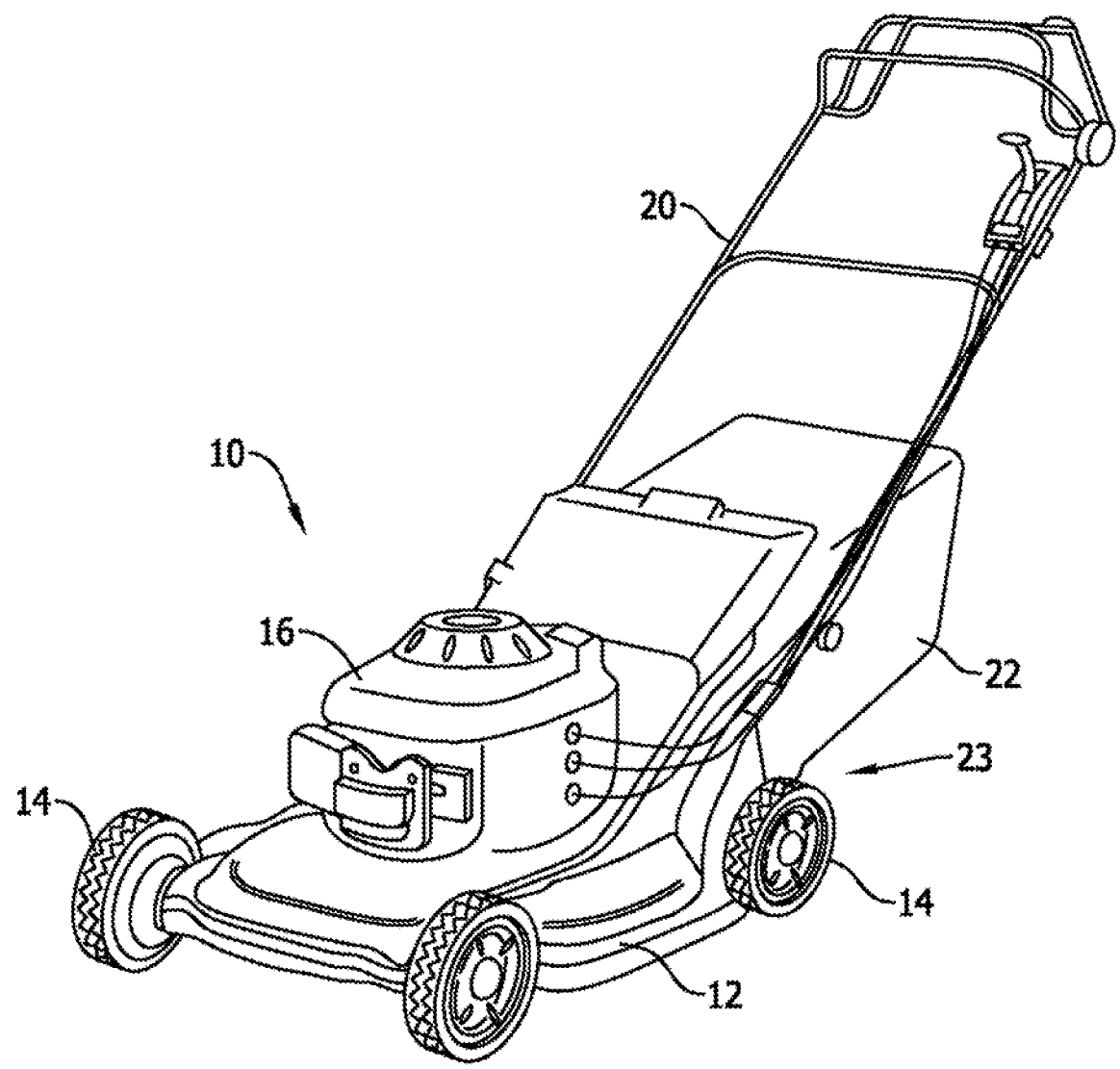
FIG. 1 is a perspective view of an exemplary lawnmower.

FIG. 1 is a perspective view of a lawnmower 10 that may include a variable mulching system (not shown in FIG. 1). More specifically, in the exemplary embodiment, lawnmower 10 includes a deck 12, wheels 14, and a prime mover 16 (e.g., an internal combustion engine or an electric motor) mounted to the deck 12. At least one blade (not shown in FIG. 1) is coupled to prime mover 16 below deck 12, and a steering handle 20 is coupled to deck 12 such that handle 20 extends upwardly from deck 12. In the exemplary embodiment, mower 10 includes an optional collection bag 22 removably coupled a rear side 23 of mower deck 12.

Figure 2:
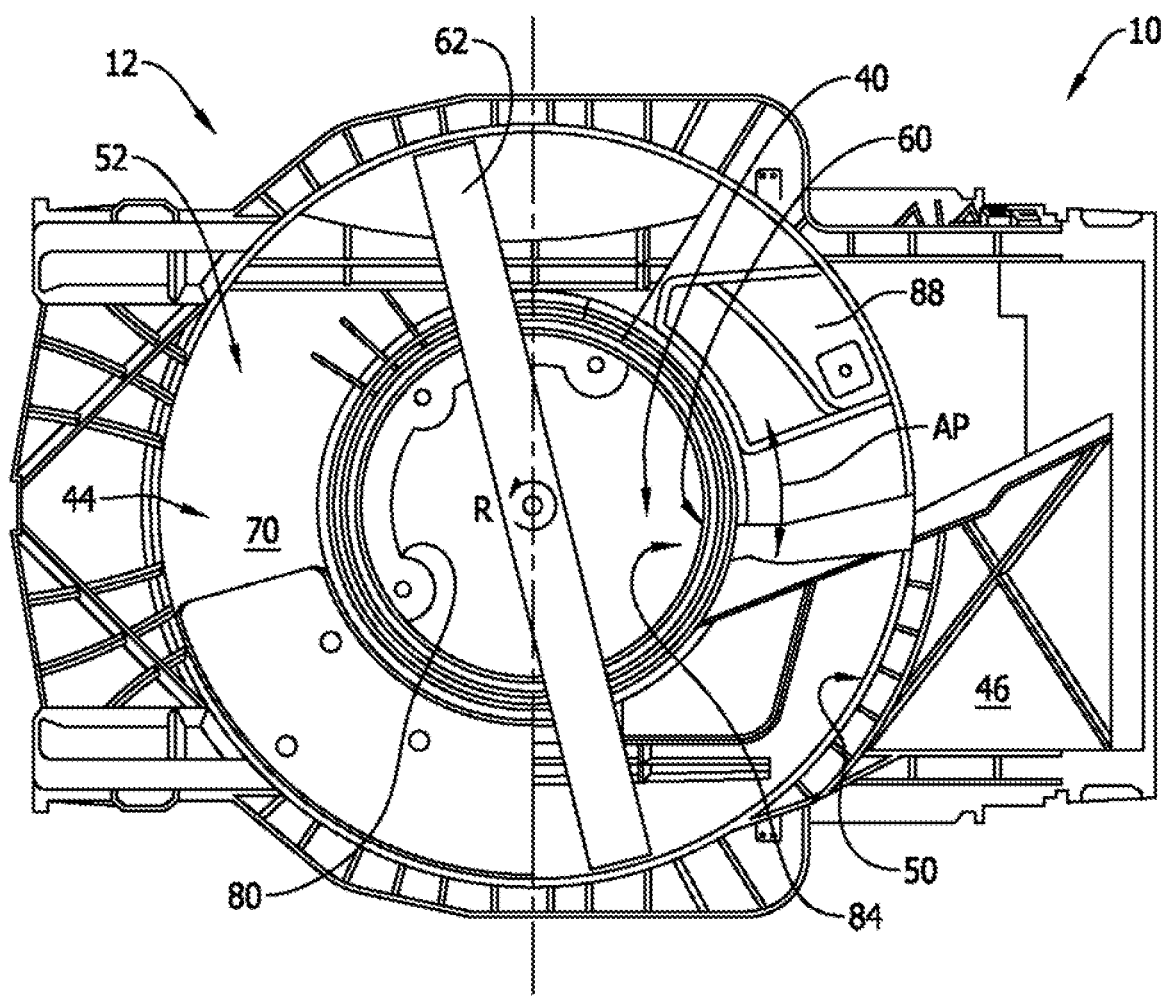
FIG. 2 is a plan view of the bottom of the lawnmower shown in FIG. 1 and including an exemplary variable mulching assembly.

FIG. 2 is a plan view of the bottom of deck 12 and illustrates an exemplary variable mulching assembly 40. FIGS. 3-10 illustrate the various components of the variable mulching assembly 40. In the exemplary embodiment, deck 12 includes a cutter housing 44 and a discharge chute 46 that extends outwardly from housing 44. More specifically, cutter housing 44 is formed with a discharge opening 50 that is substantially aligned with discharge chute 46 to enable a cavity 52 defined within cutter housing 44 to be selectively coupled with chute 46 as described in more detail below. Collection bag 22 (shown in FIG. 1) can be removably coupled to chute 46 to collect clippings for disposal away from the lawn. In the exemplary embodiment, deck 12 also includes an engine mount 60 that is centrally positioned on cutter housing 44 to prime mover 16 (shown in FIG. 1) to couple to deck 12.

A blade 62 coupled to prime mover 16 rotates within cutter housing 44. In the exemplary embodiment, blade 62 is a mulching blade configured as a single cutting element. In alternative embodiments, blade 62 may include multiple cutting elements. In each embodiment, blade 62 rotates about an axis of rotation R in cutting plane defined within cutter housing 44. Vegetation in the path of rotation of blade 62 is cut at a level of the cutting plane and tends to circulate adjacent an upper surface 70 of cutter housing 44 until a saturation amount of circulating clippings is reached. After the saturation level of clippings is reached, the circulating clippings begin to fall back down across blade 62 where they are cut again and dispersed into the lawn below the cutting plane when the mower 10 is in a full mulching mode, and/or are blown through discharge opening 50 and into discharge chute 46 when mower 10 is in a full discharge mode. It should be noted, as described in more detail below, variable mulching assembly 40 may be placed in an intermediate mode between the full mulching and discharge modes.

Variable mulching assembly 40 is selectively rotatable or shiftable within cutter housing 44 between a first position 84 (FIG. 9), i.e., a full mulching mode, and a second position 86 (FIG. 10), i.e., a full discharge/bagging mode. More specifically, and as described in more detail below, variable mulching assembly 40 includes a shutter plate 88 that can rotate along an arcuate path AP between first and second positions 84 and 86, respectively. Shutter plate 88 is selectively moveable along arcuate path AP between positions 84 and 86 and may be positioned at any intermediate location between positions 84 and 86, as shown in FIGS. 9 and 10.

In the exemplary embodiment, second position 86 is a full discharge or full bagging position where discharge opening 50 is substantially unobstructed by shutter plate 88. In contrast, in the exemplary embodiment, first position 84 can be a full mulching position wherein plate 88 substantially obstructs discharge opening 50. Additionally, shutter plate 88 can translate to any position intermediate first and second positions 84 and 86, respectively. In the exemplary embodiment, cutter housing 44 is annular and shutter plate 88 extends circumferentially across a sector of cutter housing 44.

Figure 3:
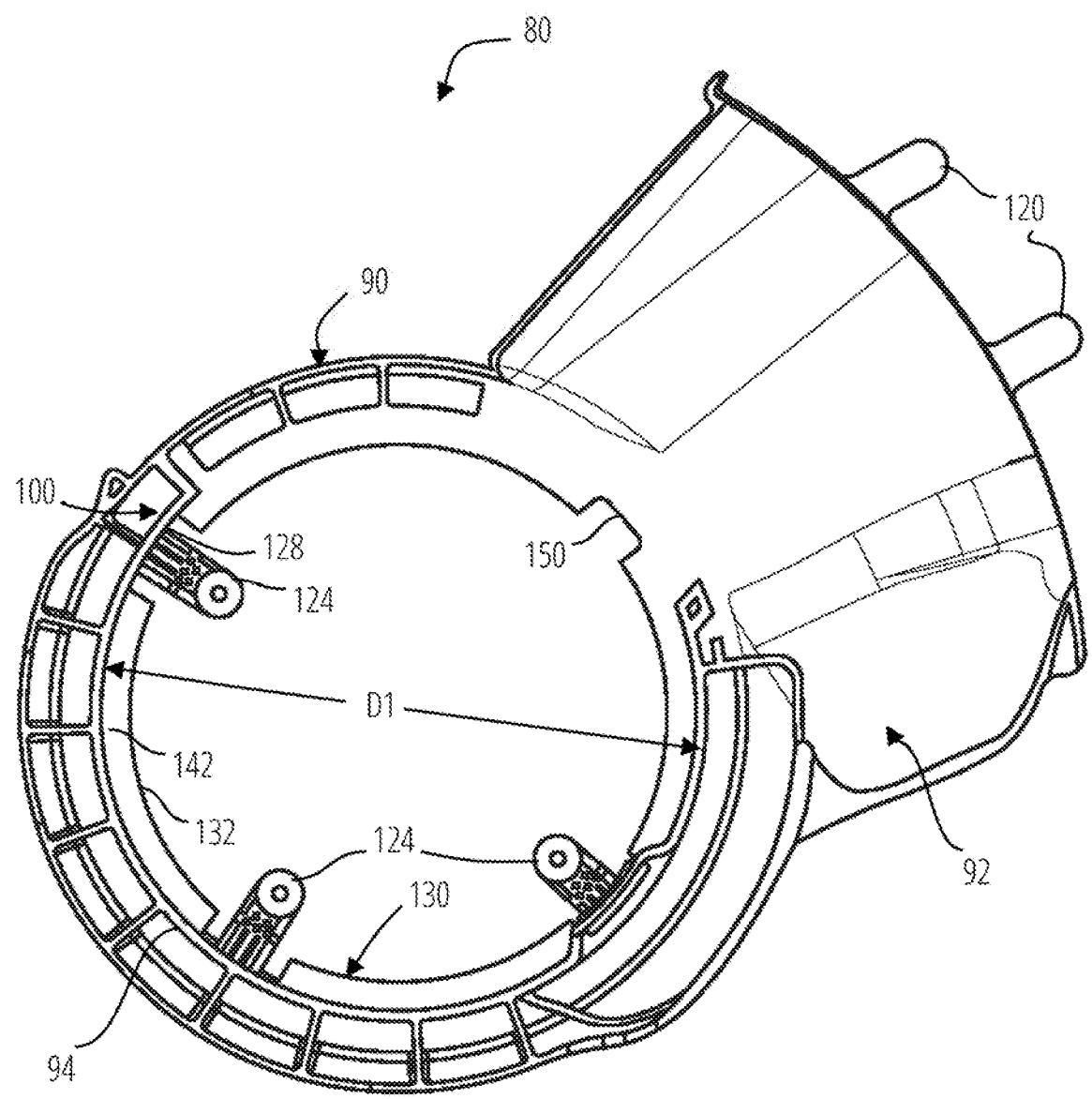
FIG. 3 is a plan view of the top side of an exemplary mounting ring that may be used with the mulching assembly shown in FIG. 2.
Figure 4:
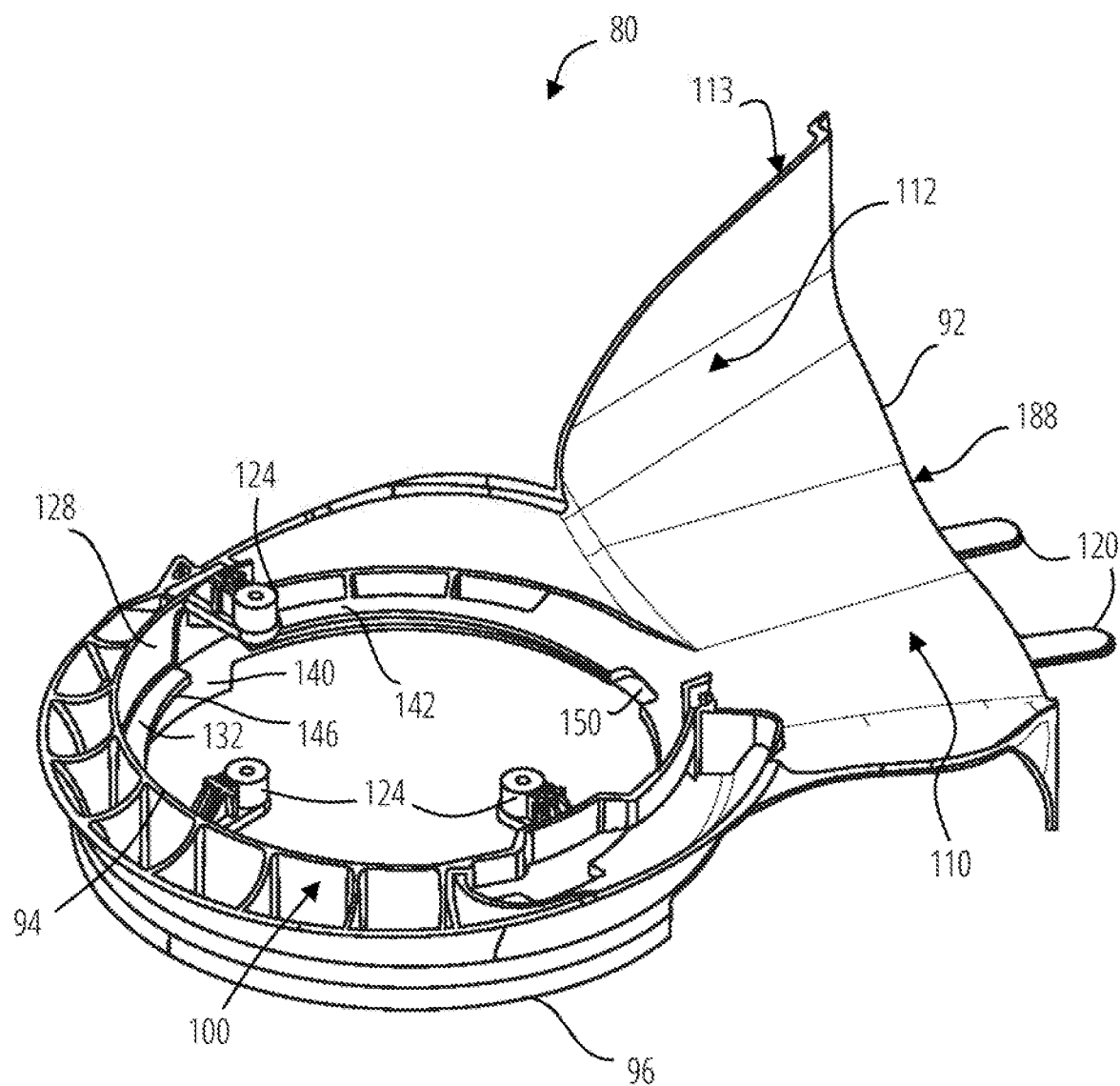

Referring to FIGS. 3 and 4, in the exemplary embodiment, mulching assembly 40 includes a mounting ring 80 that is coupled substantially concentrically to cutter housing 44. More specifically, in the exemplary embodiment, mounting ring 80 includes an annular ring portion 90 and a discharge plate portion 92. In the exemplary embodiment, annular ring portion 90 is formed integrally with discharge plate portion 92 in a one-piece assembly. Alternatively, annular ring portion 90 may be formed of several independent pieces coupled together to form a unitary component. Annular ring portion 90 is substantially circular in the exemplary embodiment, and includes an upper surface 94, a lower surface 96, and a sidewall 100 that extends generally perpendicularly there between. In the exemplary embodiment, sidewall 100 is annular and is formed with an inner diameter $D_1$. Discharge plate portion 92 extends generally radially outwardly from sidewall 100 along a circumferential distance $D_2$ across a sector of mounting ring 80, as shown in FIG. 9.

Figure 9:
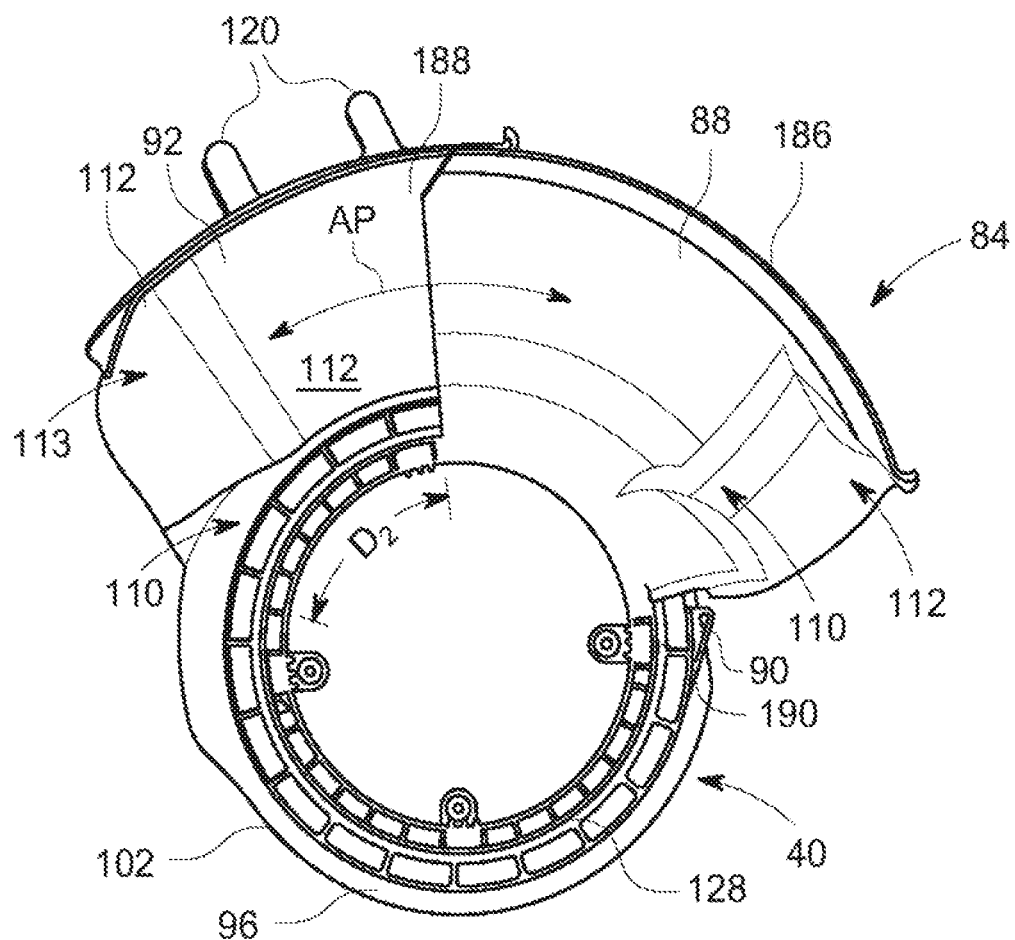
FIG. 9 is an enlarged plan view of the bottom of the mulching system shown in FIG. 2 and in a mulching mode.
Figure 10:
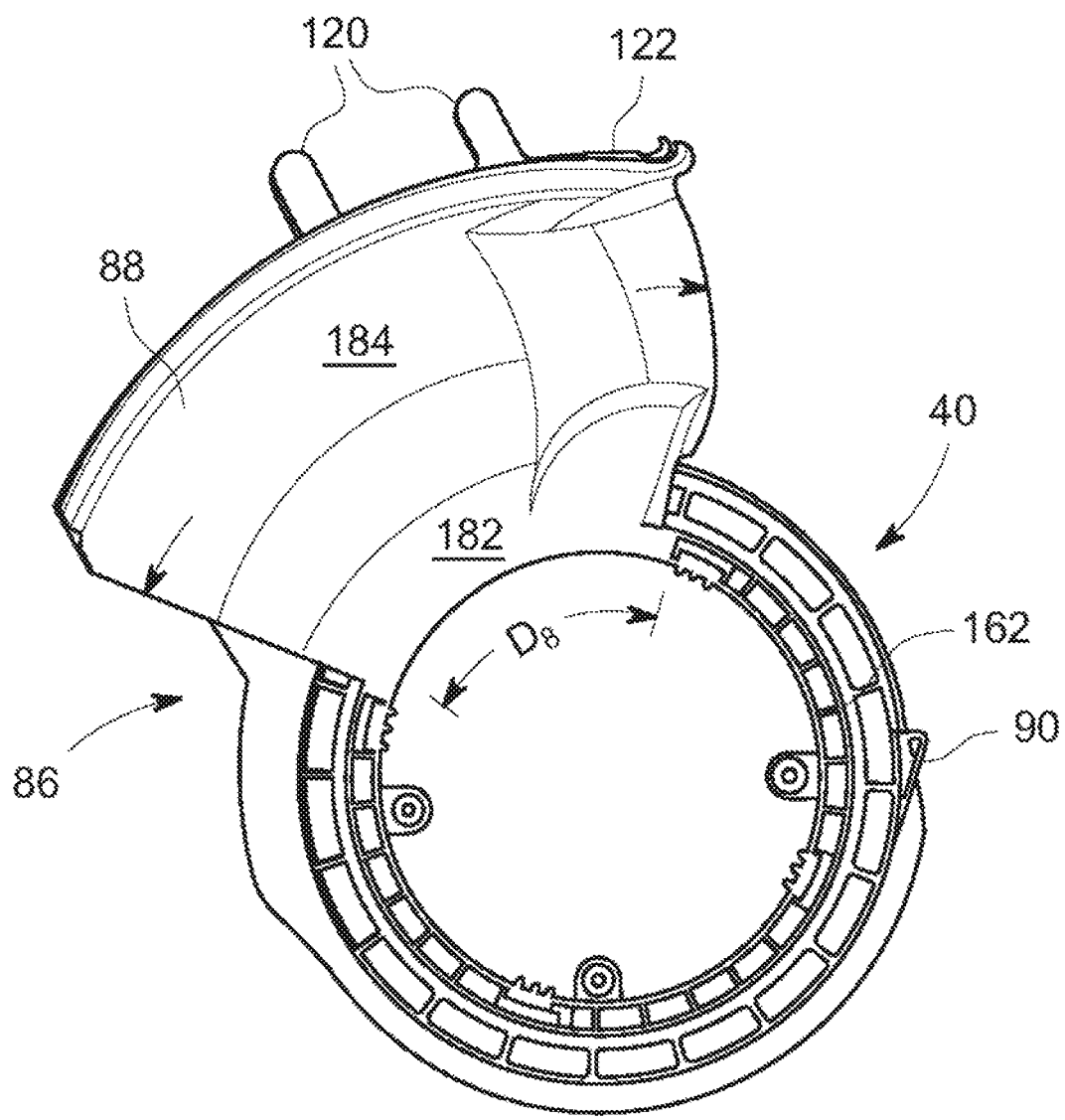
FIG. 10 is a plan view of the bottom of the mulching assembly shown in FIG. 6 and in a discharge mode.

Referring to FIGS. 4 and 9, in the exemplary embodiment, discharge plate portion 92 is formed with a generally arcuate profile that extends vertically from annular ring portion 90. More specifically, in the exemplary embodiment, discharge plate portion 92 is formed with a generally horizontal portion 110 and an oblique portion 112 that extends vertically from portion 110. Referring to FIG. 4, portions 110 and 112 cooperate to form discharge plate portion 92 with an upper surface 113 having an overall contour that substantially mirrors a contour defined by the cutter housing 44 (shown in FIG. 2).

Moreover, in the exemplary embodiment, mounting ring 80 also includes a plurality of alignment pins 120 that extend outwardly from an edge 122 of discharge plate portion 92 (shown in FIG. 9). Alignment pins 120 facilitate securing the edge 122 to cutter housing 44 in proper alignment. Moreover, pins 120 "murphy proof" the installation of the mounting ring 80 and prevent the mounting ring 80 from being coupled to cutter housing 44 in any improper orientations. In addition, mounting ring 80 also includes a plurality of mounting tab features 124 that extend radially inwardly from an inner surface 128 of sidewall 100, as shown in FIG. 3. Sidewall inner surface 128 defines inner diameter $D_1$. Mounting tab features 124 each facilitate securing mounting ring 80 to cutter housing 44 via fasteners (not shown).

In the exemplary embodiment, mounting ring 80 includes at least one platform track 130 defined therein. More specifically, in the exemplary embodiment, platform track 130 is segmented into three arcuate platform track segments 132, as shown in FIGS. 3 and 4. Platform track segments 132 are each defined extending interior from sidewall 100 and platform track segments 132 are substantially axially-aligned relative to sidewall 100. In the exemplary embodiment, each platform track segment 132 is spaced substantially equally in areas of sidewall 100 that are not within the circumferential distance $D_2$ bounded by discharge plate portion 92 (shown in FIG. 9). Moreover, each platform track segment 132 extends interior from sidewall inner surface 128.

Figure 8:
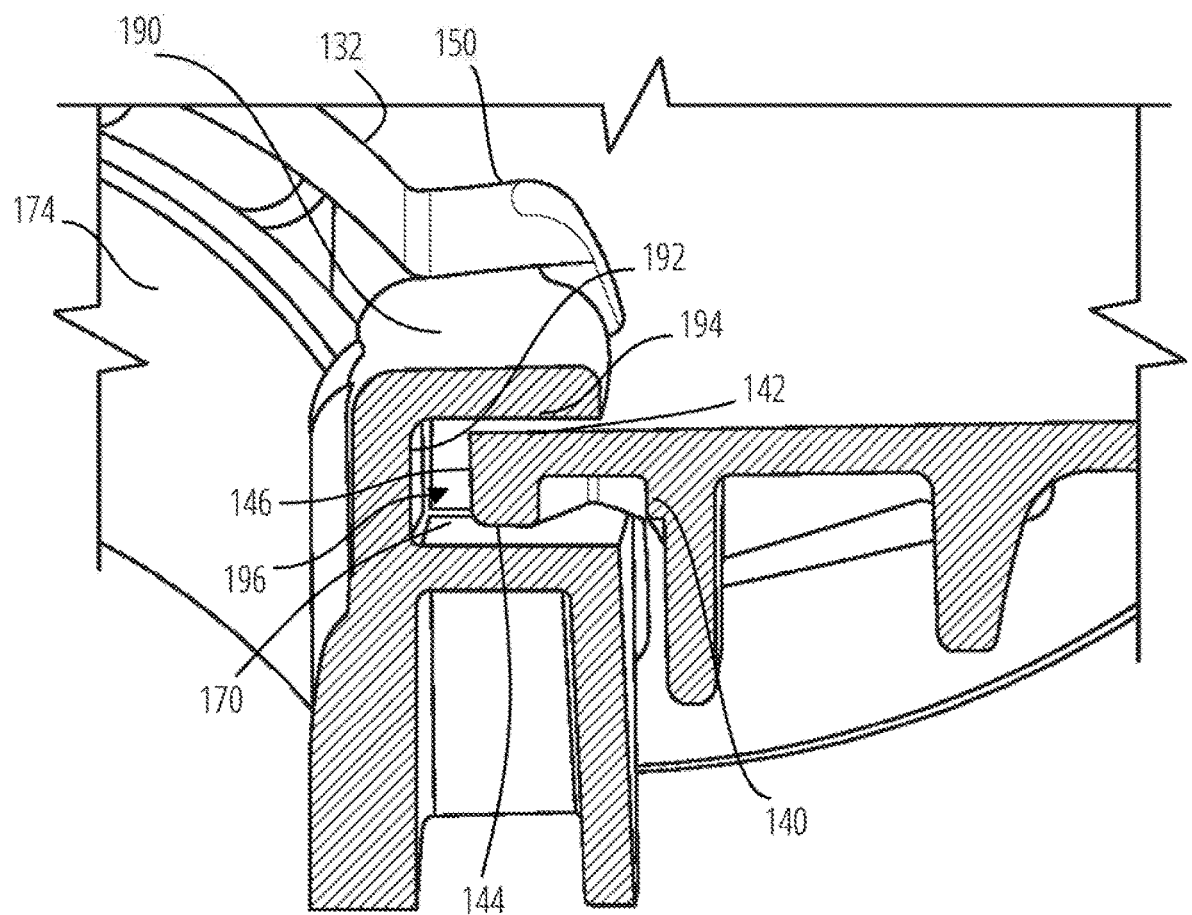
FIG. 8 is a cutaway view of FIG. 7 along section line AA.

In the exemplary embodiment, platform track segments 132 are substantially identical. Accordingly, each platform track segment 132 is defined by a rear wall 140, an upper track surface 142, and a lower track surface 144, a lip 146, as shown in FIG. 8. The length of the upper track surface 142, the lower track surface 144, and height of the lip 146 are each substantially constant within each platform track segment 132. Platform track segments 132 are radially aligned such that its rear wall 140 collectively defines a platform track 130 outer diameter $D_1$.

Each installation tab 150 is defined in sidewall inner surface 128. More specifically, each installation tab 150 extends substantially perpendicularly in an axial direction through the platform track segment 132 to mounting ring portion lower surface 96. Alternatively, installation tab 150 and/or platform track 130 may have any other orientation that enables mulching assembly 40 to function as described herein.

Figure 5:
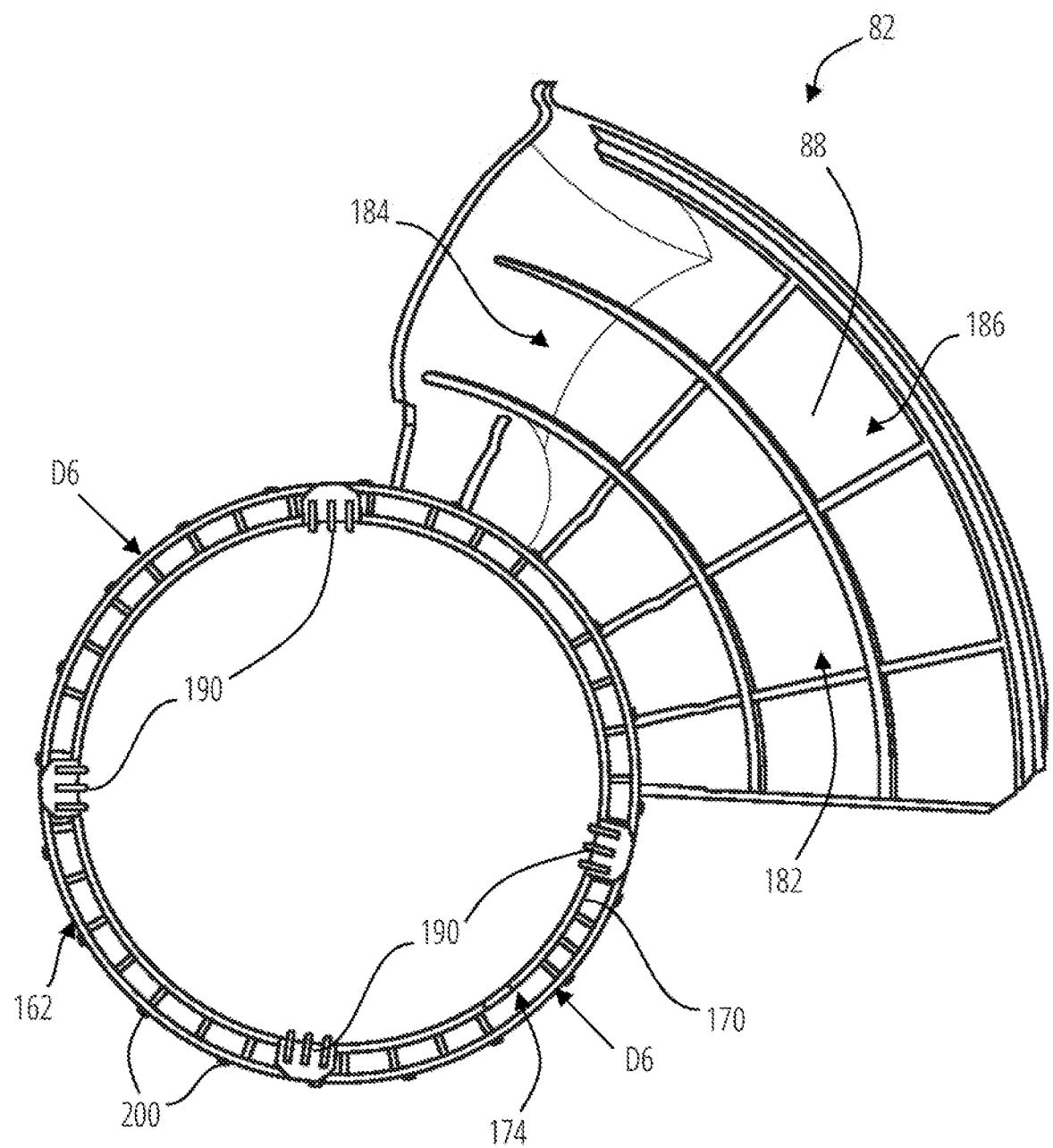
FIG. 5 is a plan view of the top side of an exemplary shutter ring that may be used with the mulching assembly shown in FIG. 2.
Figure 6:
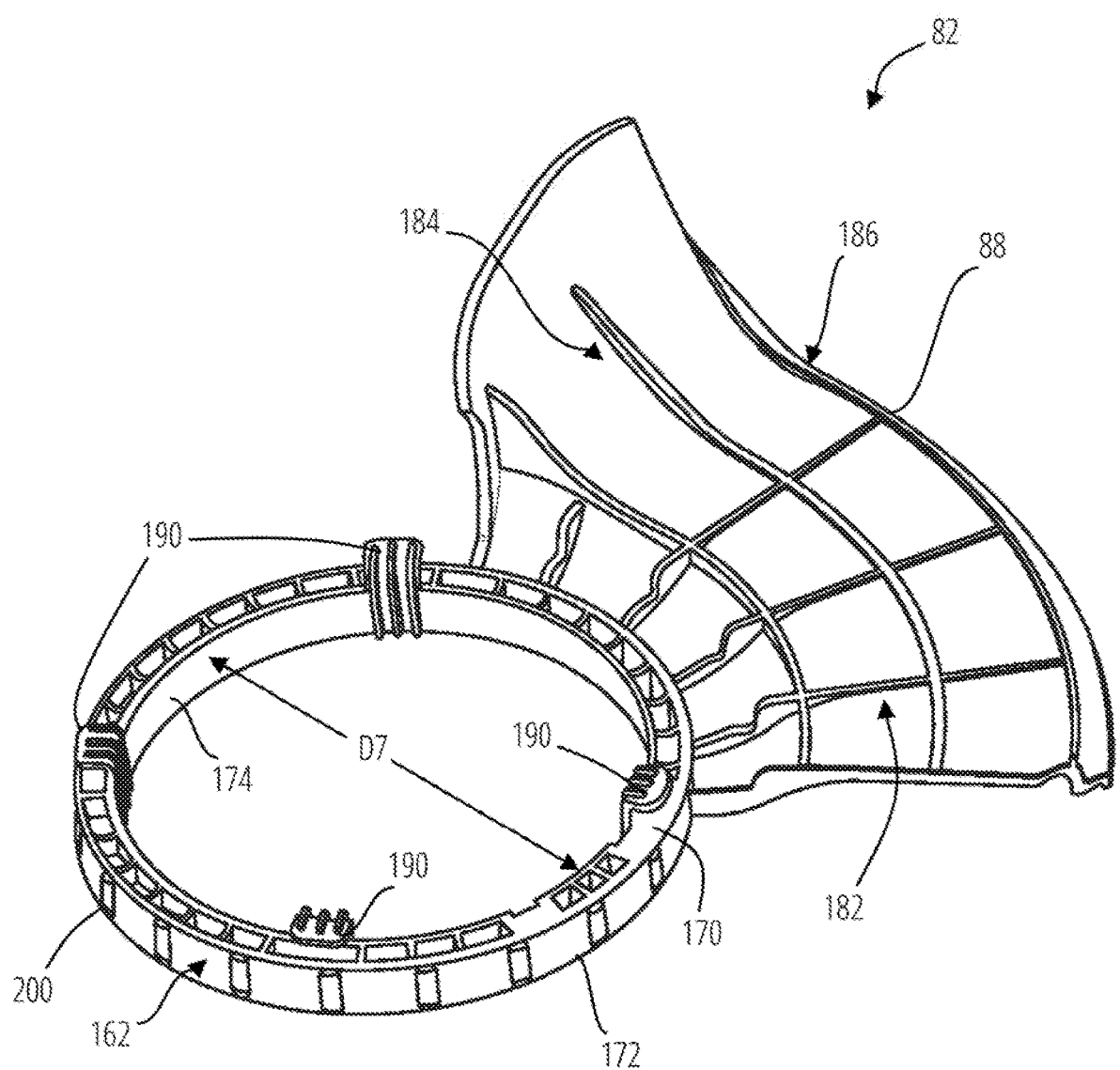
FIG. 6 is a perspective view of the shutter ring shown in FIG. 5.

Referring to FIG. 5, in the exemplary embodiment, mulching assembly 40 also includes a shutter ring 82 that is coupled substantially concentrically to cutter housing 44. More specifically, in the exemplary embodiment, and as described in more detail below, shutter ring 82 is rotatably coupled, substantially concentrically to mounting ring 80. Moreover, in the exemplary embodiment, shutter ring 82 includes an annular band portion 162 and shutter plate 88. In the exemplary embodiment, annular band portion 162 is formed integrally with shutter plate 88 in a one-piece assembly. Alternatively, shutter ring 82 may be formed of several independent pieces coupled together to form a unitary component. Annular band portion 162 is substantially circular in the exemplary embodiment, and includes an upper surface 170, a lower surface 172, and a sidewall 174 that extends generally perpendicularly there between. In the exemplary embodiment, sidewall 174 is annular and is formed with an outer diameter $D_6$ and an inner diameter $D_7$, as shown in FIGS. 5 and 6. Shutter plate 88 extends generally radially outward from sidewall 174 along a circumferential distance Ds across a sector of annular band portion 162, as shown in FIG. 10.

In the exemplary embodiment, shutter plate 88 is formed with a generally arcuate profile that extends vertically from annular band portion lower surface 172 and along an annular band outer surface 200 of annular band portion 162, as shown in FIG. 6. More specifically, in the exemplary embodiment, shutter plate 88 is formed with a generally horizontal portion 182 and an oblique portion 184 that extends vertically from portion 182. Portions 182 and 184 cooperate to form shutter plate contour 186 having an overall contour that substantially mirrors a discharge plate contour 188, as shown in FIGS. 4 and 9.

In the exemplary embodiment, shutter ring 82 includes a plurality of hooks 190 that extend vertically from band portion lower surface 172. In the exemplary embodiment, hooks 190 extend vertically from annular band portion 162. Specifically, in the exemplary embodiment, shutter ring 82 includes three hooks 190. Alternatively, shutter ring 82 may include any number of hooks 190, i.e., more or less than three hooks 190, that enables mulching assembly 40 to function as described herein. In the exemplary embodiment, hooks 190 are spaced substantially equally in areas of sidewall 174 that are not within the circumferential distance D8 bounded by shutter plate 88, as shown in FIG. 10. As such, in the exemplary embodiment, hooks 190 are separated by approximately 90°. Moreover, in the exemplary embodiment, each hook 190 is substantially aligned with outer diameter $D_6$, as shown in FIG. 5. Outer diameter $D_6$ may be the same as the outer diameter of sidewall 174. Alternatively, hooks 190 may be positioned at any orientation and/or spacing that enables mulching assembly 40 to function as described herein.

In the exemplary embodiment, shutter ring 82 includes a plurality of hooks 190 that are substantially identical. As shown in FIG. 8, hooks 190 may include a vertical extension 192 that extends vertically from lower surface 172 along sidewall 174, and a horizontal extension 194. Horizontal extension 194 may extend until aligned with annular band outer surface 200. The vertical extension 192 and horizontal extension 194 creates a u-shaped opening 196 above upper surface 170. In the exemplary embodiment, the at least one hook 190 are sized so they fit through the at least installation tab 150. Also, u-shaped opening 196 is sized so it can rotate along the platform track 130. Hooks 190 are envisioned to be molded with the shutter ring 82, however, they may be secured to the shutter ring 82 by other means, such as fasteners. Additionally, the orientation and size of the vertical extension 192 and horizontal extension 194 may vary depending on the size of the platform track 130.

In the exemplary embodiment, shutter ring 82 is rotatably coupled to mounting ring 80 without the use of mechanical fasteners, as are typically used in known mulching assemblies. Specifically, during assembly, shutter ring 82 is positioned adjacent to mounting ring 80 such that at least one hook 190 is substantially centered relative to the installation tab 150. Shutter ring 82 is then inserted concentrically into mounting ring 80 such that the upper track surface 142 and the lower track surface 144 of the platform track 130 is inside the u-shaped opening 196 of each hook 190. The u-shaped opening 196 is received in sliding contact with upper track surface 142, and lower track surface 144 of the platform track 130. Shutter ring 82 is then rotated such that hooks 190 are slid into a respective platform track segment 132 such that shutter ring 82 is rotatably coupled to mounting ring 80 in a "twist-fit connection". Moreover, in the exemplary embodiment, both mounting ring 80 and shutter ring 82 are fabricated from any material that also facilitates preventing wear between the components. For example, in one embodiment, mounting ring 80 and/or shutter ring 82 are fabricated from a molded plastic material.

When fully assembled, shutter ring 82 is rotatably coupled substantially concentrically within mounting ring 80 such that shutter ring 82 annular band portion 162 is in slidable contact with mounting ring 80 annular ring portion 90. More specifically, when fully assembled, at least one hook 190 is retained along the platform track segments 132, and annular band portion outer surface 200 is in slidable contact with sidewall inner surface 128 of mounting ring 80. Moreover, when fully assembled, depending on a relative position of shutter ring 82 and mounting ring 80, shutter plate contour 186 substantially mates against discharge plate contour 188, as shown in FIG. 9.

In an alternative embodiment, mounting ring 80, rather than shutter ring 82, includes a plurality of hooks, such as hooks 190, which are sized and oriented to engage a platform track 130, which is defined in shutter ring 82, rather than in mounting ring 80. Moreover, in another alternative embodiment, mounting ring 80 is sized and configured to couple within shutter ring 82 such that shutter ring 82 circumscribes mounting ring 80. In such an embodiment, shutter ring 82 may still move relative to mounting ring 80.

Figure 7:
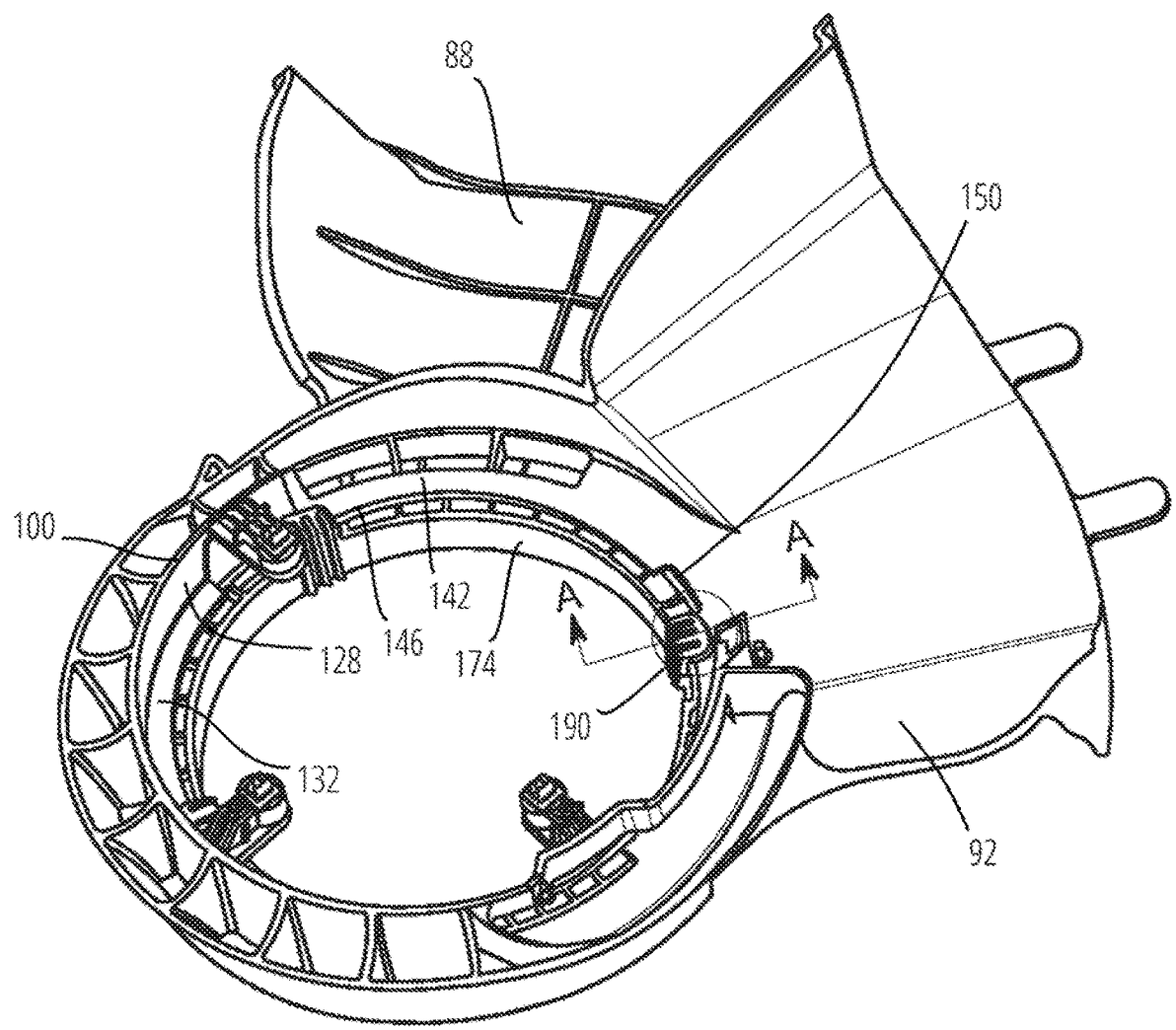
FIG. 7 is a perspective view of the shutter ring installed to the mounting ring.
Figure 11:
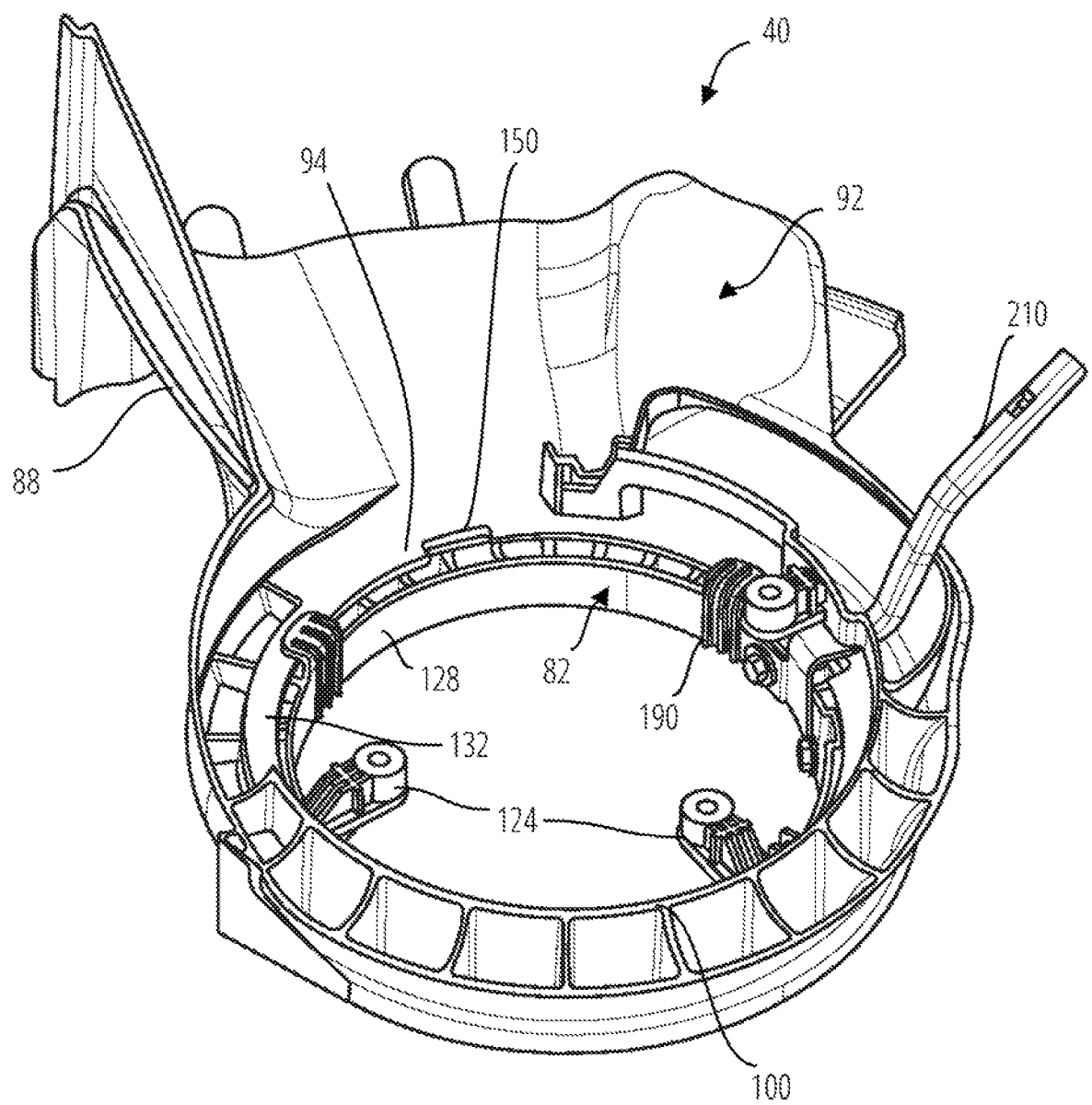
FIG. 11 is a perspective view of the shutter ring with lever installed to the mounting ring.

During mower operations, after mounting ring 80 is securely coupled to cutter housing 44 via mounting tab features 124, shutter ring 82 is selectively moveable by a user via a lever 210 as shown in FIG. 11. Lever 210 is secured to the shutter ring 82 and accessible from the deck 12. More specifically, during normal operations, although selectively moveable along platform track segment 132, shutter ring is constrained axially within platform track segment 132 and circumferential movement along the platform track segment 132 is limited to prevent hooks 190 from entering installation tab 150. As such, variable mulching assembly 40 is selectively shiftable from first position 84 to second position 86, and may be positioned intermediate positions 84 and 86. More specifically, when fully assembled, shutter plate 88 is selectively moveable along arcuate path AP, as shown in FIGS. 6 and 7.

The relative position of shutter plate 88 controls the circulation of clippings within cutter housing 44. As shutter plate 88 is selectively moved from the full discharge/bagging position 86 to the full mulching position 84, shutter plate 88 extends by various degrees across discharge opening 50. As opening 50 becomes obstructed, clipping that could be discharged through opening 50 are recirculated within cutter housing 44 and redirected towards blade 18 for mulching, prior to being blowing into the lawn. When at least a portion of discharge opening 50 is unobstructed by shutter plate 88, at least some of the clippings circulating within cutter housing 44 can be discharged from housing 44 through opening 50. By regulating the position of shutter plate 88, in response to the cutting conditions, the operator can control the amount of grass being collected and mulched at any given time.

The above-described variable mulching system provides a mulching assembly that is variably positionable between a full mulching mode and a full discharge mode, and any position intermediate those two modes. The mulching assembly described herein is cost-effective to manufacture and assemble and facilitates reducing labor costs and the number of components typically required in known mulching assemblies. More specifically, the mulching assembly described herein uses a mounting ring that is rotatably coupled to a shutter plate without the use of mechanical hardware, adhesives, welding, or any other similar fastening technique. Rather, the mulching assembly described herein is rotatably coupled in a twist fit connection. As a result, a mulching assembly is provided that facilitates increasing the flexibility to the mower operator while reducing costs in a cost-effective and reliable manner.

Exemplary embodiments of variable mulching systems are described above in detail. Although the variable mulching systems are herein described and illustrated in association with a walk-behind lawnmower, the invention is also intended for use on commercial walk-behind mowers, riding mowers and lawn tractors. Moreover, it should also be noted that the components of the mulching assembly are not limited to the specific embodiments described herein, but rather, aspects of each component may be utilized independently and separately from other components and methods of assembly described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A lawnmower comprising:
    a housing comprising a discharge opening;
    a mulching system comprising a mounting ring and a shutter ring, said mounting ring coupled substantially concentrically to said housing and comprising an upper surface, a lower surface, and a sidewall extending substantially axially there between, said sidewall comprising a platform track and at least one installation tab;
    said shutter ring comprises an upper surface, a lower surface, and a sidewall extending substantially axially there between, said sidewall comprises at least one hook extending vertically for coupling said shutter ring to said mounting ring; and
    said platform track extending interior at least partially circumferentially along an inner surface of said sidewall of said mounting ring, said shutter ring rotates about said mounting ring via said platform track such that said shutter ring is selectively shiftable between a mulching mode and a discharge mode.

2. A lawnmower in accordance with claim 1 wherein a portion of said shutter ring substantially blocks said discharge opening when said shutter ring is rotated to the mulching mode.

3. A lawnmower in accordance with claim 2 wherein said platform track is oriented to enable each said at least hook to slide therein and to substantially prevent axial movement of each said at least one hook relative to said mounting ring.

4. The tire patch clamp assembly of claim 3 wherein the threaded rod is coated with grease reducing air loss and lubricating the o-ring.

5. The tire patch clamp assembly of claim 1 wherein the end of the threaded rod inserted through the nut is peened to prevent disassembly.

6. A lawnmower in accordance with claim 1 wherein said at least one hook includes a u-shaped opening facing outward.

7. A lawnmower in accordance with claim 6 wherein each said u-shaped opening of the at least one hook is slidably inserted along said platform track where the platform track is inside said u-shaped opening.

8. A lawnmower in accordance with claim 3 wherein each said u-shaped opening and is sized to be received along said at least one installation tab, said platform track is oriented to retain said shutter ring in contact with said u-shaped opening during lawnmower operation.

9. A lawnmower convertible between a mulching mode and a bagging mode, said lawnmower comprising:
  a housing comprising a discharge opening;
  a mounting ring coupled substantially concentrically to said housing, said mounting ring comprising an annular ring portion and a discharge plate portion extending radially outward; and
  a shutter ring coupled to said mounting ring such that said shutter ring is substantially concentrically aligned with respect to said mounting ring, said shutter ring comprising an annular band portion and a shutter plate portion extending radially outward, one of said annular ring portion and said band portion comprises at least one platform track defined therein, the other of said annular ring portion and said annular band portion comprises at least one hook extending vertically therefrom, said at least one hook is sized for insertion on to said platform track to rotatably couple said mounting ring to said shutter ring, said shutter ring is coupled to said mounting ring via said at least one hook traveling along said platform track.

10. A lawnmower in accordance with claim 9 wherein said at least one platform track is oriented to maintain said mounting ring in rotatable contact with said shutter ring such that said at least hook remains secured along said at least platform track during lawnmower operations.

11. A lawnmower in accordance with claim 10 wherein said at least one hook extends vertically from a sidewall of said annular band portion, said platform track extends radially interior from said annular ring portion.

12. A lawnmower in accordance with claim 10 wherein said at least one platform track is oriented to retain said at least one hook therein such that a platform upper track surface and a lower track surface is slidably coupled in an u-shaped opening of said at least one hook.

13. A lawnmower in accordance with claim 10 wherein said shutter ring is selectively shiftable between the mulching mode and the bagging mode.

14. A lawnmower in accordance with claim 13 wherein a portion of said shutter ring substantially blocks said housing discharge opening when said shutter ring is rotated to the mulching mode.

15. A lawnmower in accordance with claim 10 wherein said at least one platform track is configured to retain said at least hook therein such that said at least hook is slidable along the platform track and is substantially prevented from moving axially relative to said mounting ring during lawnmower operations.

16. A lawnmower in accordance with claim 10 wherein said at least one platform track comprises at least two arcuate portions, said at least two arcuate portions are substantially coaxially aligned relative to said mounting ring.

17. A lawnmower in accordance with claim 10 wherein said at least one hook includes a u-shaped opening facing outward.

18. A lawnmower in accordance with claim 17 wherein said at least one platform track comprises an installation tab, said installation tab is sized to receive said at least one hook therein to:
  enable said u-shaped opening to be slidably inserted onto said platform track where said platform track is contained inside said u-shaped opening during coupling of said shutter ring to said mounting ring; and
  enable said at least one hook to be slidably removed from said platform track arcuate portion during disassembly of said shutter ring from said mounting ring.

19. A mulching assembly for use with a lawnmower including a cutter housing, said mulching assembly comprising:
  a mounting ring configured to couple to the cutter housing, said mounting ring comprising an annular ring portion and a discharge plate portion extending outwardly from said plate portion; and
  a shutter ring coupled to said mounting ring without the use of mechanical fasteners, said shutter ring comprising an annular band portion and a shutter plate portion extending outwardly from said plate portion, said annular ring portion comprises at least two arcuate platform tracks defined therein, said annular band portion comprises at least two hooks extending vertically therefrom, each of said at least two hooks sized so that said platform track is inside a u-shaped opening of said at least two hooks, said at least two hooks couple said mounting ring to said shutter ring in a twist fit.

20. A mulching assembly in accordance with claim 19 wherein said at least two platform tracks are configured to maintain said shutter ring in slidable contact with said mounting ring during mowing operations, said shutter ring is selectively moveable relative to said mounting ring between a mulching mode of operation and a discharge mode of operation.

* * * * *